(12) United States Patent
Agrawal

(10) Patent No.: US 12,738,773 B2
(45) Date of Patent: Sep. 15, 2026

(54) METHOD AND SYSTEM OF WIRELESS POWER SHARING

(71) Applicant: SAMSUNG ELECTRONICS CO., LTD., Suwon-si (KR)

(72) Inventor: Pulkit Agrawal, Noida (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 200 days.

(21) Appl. No.: 18/734,792

(22) Filed: Jun. 5, 2024

(65) Prior Publication Data

US 2024/0364143 A1 Oct. 31, 2024

Related U.S. Application Data

(63) Continuation of application No. PCT/KR2022/001909, filed on Feb. 8, 2022.

(30) Foreign Application Priority Data

Dec. 13, 2021 (IN) ............................ 202111058028

(51) Int. Cl.
*H02J 50/80* (2016.01)
*H02J 50/90* (2016.01)
*H04W 4/80* (2018.01)

(52) U.S. Cl.
CPC ............... *H02J 50/80* (2016.02); *H04W 4/80* (2018.02)

(58) Field of Classification Search
CPC ... H04B 5/00; H04B 5/20; H04B 5/22; H04B 5/24; H04B 5/263; H04B 5/79; H04W 4/80; H02J 50/00; H02J 50/005; H02J 50/10; H02J 50/12; H02J 50/40; H02J 50/80; H02J 50/90; H02J 2105/40; H02J 2105/44
See application file for complete search history.

(56) References Cited

U.S. PATENT DOCUMENTS 9,615,254 B2 * 4/2017 Lord ...................... H04W 4/80
10,193,396 B1 1/2019 Bell et al.
(Continued)

OTHER PUBLICATIONS

Communication issued on Jul. 3, 2026 by the Intellectual Property India in Indian Patent Application No. 202111058028.

*Primary Examiner* — Quochien B Vuong
(74) *Attorney, Agent, or Firm* — Sughrue Mion, PLLC

(57) ABSTRACT

A method of wireless power sharing includes initiating a wireless power sharing session; mutually authenticating a first electronic device with a second electronic device wirelessly; determining, a physical disposition of the first electronic device or the second electronic device as a part of the wireless power sharing session; computing a power profile and transferring wirelessly the power profile; identifying a plurality of computational resources eligible for a handover based on artificial intelligence techniques and the power profile; and transferring an information wirelessly for triggering a handover of the plurality of computational resources, wherein the transferring is defined as at least one of: transferring of the information of the plurality of computational resources from the first electronic device to the second electronic device; or transferring of the information of the plurality of computational resources from the second electronic device to the first electronic device.

15 Claims, 16 Drawing Sheets

(56) References Cited

U.S. PATENT DOCUMENTS

| | | | | |
|---|---|---|---|---|
| 10,291,055 | B1 * | 5/2019 | Bell | H02J 50/80 |
| 10,468,903 | B2 * | 11/2019 | Park | H02J 50/10 |
| 10,749,574 | B2 * | 8/2020 | Park | H04B 5/79 |
| 11,941,602 | B2 * | 3/2024 | Lim | H02J 50/12 |
| 12,113,790 | B2 * | 10/2024 | Kim | H02J 50/40 |
| 2013/0043738 | A1 | 2/2013 | Park et al. | |
| 2020/0266667 | A1 | 8/2020 | Lee et al. | |
| 2021/0273491 | A1 | 9/2021 | Lee et al. | |

* cited by examiner

METHOD AND SYSTEM OF WIRELESS POWER SHARING

CROSS-REFERENCE TO RELATED APPLICATIONS

This application is a by-pass continuation application of International Application No. PCT/KR2022/001909, filed on Feb. 8, 2022, which based on and claims priority to Indian patent application No. 202111058028 filed on Dec. 13, 2021, in the Indian Intellectual Property Office, the disclosures of which are incorporated by reference herein in their entireties.

BACKGROUND

1. Field

The present disclosure relates to wireless communication and wireless charging.

2. Description of Related Art

FIG. 1 illustrates a state-of-the-art scenario. As seen in FIG. 1, state of the art peer to peer wireless charging undergoes problems such as loss of energy due to coil-misalignment. Frequent physical pick-ups for quick-check (E.g., notification check, call answer etc.) of a bottom-device in within the peer-to-peer charging leads to misalignment. Misalignment between inductive charging coils is a major problem with wireless charging and results in loss of energy. Misalignment can cause >30% wastage of energy while sharing.

Possible cases of misalignment arise if the call is accepted. There is observed major misalignment of charging coil just to pick up & answer adds to energy-loss. If the call is rejected, physical picking up effort (of both device) just to reject the call adds inconvenience to user. Other possible cases of misalignment include wherein only glancing is done. Major misalignment of charging coil occurs just to view the notification. If the user wants to reply, it is highly inconvenient to hold both devices together while typing.

Yet another problem is inefficient use of combined resources. There is no coordination observed between devices to optimize common operations. Resources like cellular connectivity, audio or vibration output, cloud syncing, Wi-Fi/bluetooth (BT) connectivity, display etc. are used simultaneously by both devices, thereby resulting in extra power drainage. For example, during a call or notification events on top device that is being charged, there is observed inefficient use of low battery device. Top device is already low on power to play ringtone & vibrate on events. Ringtone & vibrations roles for top device can be easily handled by the bottom device while charging. Further, inefficient use of low battery device is achieved because slow charging is achieved due to continuous drainage in background tasks. Background tasks can be temporarily handled by power supplier while charging Yet another problem as encountered is interaction limitation. Only one device is available for interaction while charging device (bottom device) facing downwards is left completely unusable.

SUMMARY

This summary is provided to introduce a selection of concepts in a simplified format that is further described in the detailed description of the disclosure. This summary is not intended to identify key or essential inventive concepts of the claimed subject matter, nor is it intended for determining the scope of the claimed subject matter.

According to an embodiment, method of optimized wireless power sharing includes initiating, between a first electronic device and a second electronic device, a wireless power sharing session as a power supplier and a power consumer; mutually authenticating the first electronic device with the second electronic device wirelessly; determining, by at least one of the first electronic device or the second electronic device, a physical disposition of the first electronic device and the second electronic device as a part of the wireless power sharing session; computing, by at least one of the first electronic device or the second electronic device, a power profile and transferring wirelessly the power profile from at least one of the first electronic device to the second electronic device or from the second electronic device to the first electronic device; identifying, by at least one of the first electronic device or the second electronic device, a plurality of computational resources eligible for a handover based on artificial intelligence techniques and the power profile; and transferring an information wirelessly between the first electronic device and the second electronic device for triggering a handover of the plurality of computational resources, wherein the transferring is defined as at least one of: transferring of the information of the plurality of computational resources from the first electronic device to the second electronic device; and transferring of the information of the plurality of computational resources from the second electronic device to the first electronic device.

The method may include executing, by first electronic device and the second electronic device, incoming events targeted for at least one of the first electronic device or the second electronic device depending on resources handed over through transferring of the information, wherein the incoming events are executed individually by the first electronic device and the second electronic device or in synchronization with each other based on the transferred information.

The method may include wherein the triggering of the handover includes initiating, by the first electronic device and the second electronic device, a resource sharing session between the first electronic device and the second electronic device; and transferring the information as handover information including a list of the plurality of computational resources wirelessly between the first electronic device and the second electronic device through the resource sharing session.

The method may include wherein the wireless power sharing session includes the first electronic device acting as the power supplier; and the second electronic device acting as the power consumer; wherein at least one of the first electronic device or the second electronic device correspond to a plurality of devices acting as the power supplier or the power consumer.

The method may include wherein the mutually authenticating includes: performing, by the first electronic device and the second electronic device, a mutual authentication wirelessly involving sharing and validating identifiers of both the first electronic device and the second electronic device between the first electronic device and the second electronic device.

The method may include wherein the determining the physical disposition includes: determining, by at least one of the first electronic device or the second electronic device, a respective physical configuration within a stacked arrangement of a top device and a bottom device.

The method may include wherein the power profile includes at least one of: an average historical power usage and usage frequency of individual resources on hourly basis; an instantaneous drain rate; or current overall power levels, wherein the power profile is transferred unidirectionally or bidirectionally between the first electronic device and the second electronic device over a secure low power short range communication channel.

According to an embodiment, a method of synchronized execution of events by at least one device during wireless power sharing includes detecting, by a first electronic device, an incoming event and based thereupon determining an information associated with the incoming event; determining, by the first electronic device, a number of computational resources required for executing the incoming event based on determining the information associated with the incoming event; determining, by the first electronic device, partial resources out of the number of computational resources handed over to a second electronic device during a prior resource handover session; computing, by the first electronic device, a first partial event information out of the determined information of event, said first partial event information required for executing the determined partial resources handed over to the second electronic device; transferring, by the first electronic device, the first partial event information to the second electronic device; creating, by at least one of the first electronic device or the second electronic device, a proxy event instance for at least one of the first electronic device or the second electronic device, the proxy instance representing a partial version of the incoming event and associated with at least one of: the first electronic device and a second partial event information out of the determined information of event; or the second electronic device and the first partial event information; and executing the incoming event by one or more of: an individual execution of a partial event by either the first electronic device or the second electronic device; a synchronized execution of the proxy event instance at both the first electronic device and the second electronic device to result in a combined event execution.

The method may include wherein the incoming event may include an interrupt or trigger on an operating system or on any installed application within the first electronic device.

The method may include wherein the first partial event information is transferred on a secured low power short range communication channel.

The method may include determining, by the first electronic device, whether the incoming event is targeted for the first electronic device or for the second electronic device based on the prior resource handover session.

The method may include wherein the first electronic device corresponds to a lower device in a stacked arrangement as a power consumer device, the method including: creating by the second electronic device the proxy event instance as a power supplier, the proxy instance representing the partial version of the incoming event and associated with the first partial event information; and executing the incoming event by the individual execution of the partial event at the second electronic device.

According to an embodiment, a system of optimized wireless power sharing between at least two devices may include a configuration to perform: a first electronic device and a second electronic device for initiating a wireless power sharing session as a power supplier and a power consumer; a trusted device manager for mutually authenticating the first electronic device with the second electronic device wirelessly; a configuration checker for determining a physical disposition of the first electronic device and the second electronic device as a part of the wireless power sharing session; a power profile computer for computing a power profile of at least one of the first electronic device and the second electronic device and transferring wirelessly the power profile from at least one of the first electronic device to the second electronic device and from the second electronic device to the first electronic device; a handover resource manager configured to: identifying, by at least one of the first electronic device or the second electronic device, a plurality of computational resources eligible for a handover based on artificial intelligence techniques and the power profile; and transferring an information wirelessly between the first electronic device and the second electronic device for triggering a handover of the plurality of computational resources, wherein said transferring is defined as at least one of: transferring of the information of the plurality of computational resources from the first electronic device to the second electronic device; or transferring of the information of the plurality of computational resources from the second electronic device to the first electronic device. The system may include executing, by the first electronic device and the second electronic device, incoming events targeted for the first electronic device or the second electronic device depending on resources handed over through the transfer of the information, wherein the incoming events are executed individually by the first electronic device and the second electronic device or in synchronization with each other based on the transferred information.

According to an embodiment, a system of synchronized execution of events by at least one device during wireless power sharing may include a configuration to perform: an interceptor configured for: detecting, by a first electronic device, an incoming event and based thereupon determining an information associated with the incoming event; determining, by the first electronic device, a number of computational resources required for executing the incoming event based on determining the information associated with the incoming event; determining, by the first electronic device, partial resources out of the number of computational resources handed over to a second electronic device during a prior resource handover session; computing, by the first electronic device, a first partial event information out of the determined information of event, said first partial event information required for executing the determined partial resources handed over to the second electronic device; a sender for: transferring, by the first electronic device, the first partial event information to the second electronic device; a receiver for creating, by at least one of the first electronic device or the second electronic device, a proxy event instance for at least one of the first electronic device or the second electronic device, the proxy instance representing a partial version of the incoming event and associated with one or more of: the first electronic device and a second partial event information out of the determined information of event; the second electronic device and the first partial event information; and a simulator for executing the incoming event by at least one of: an individual execution of a partial event by either the first electronic device or the second electronic device; or a synchronized execution of the proxy event instance at the first electronic device and the second electronic device to result in a combined event execution.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1:
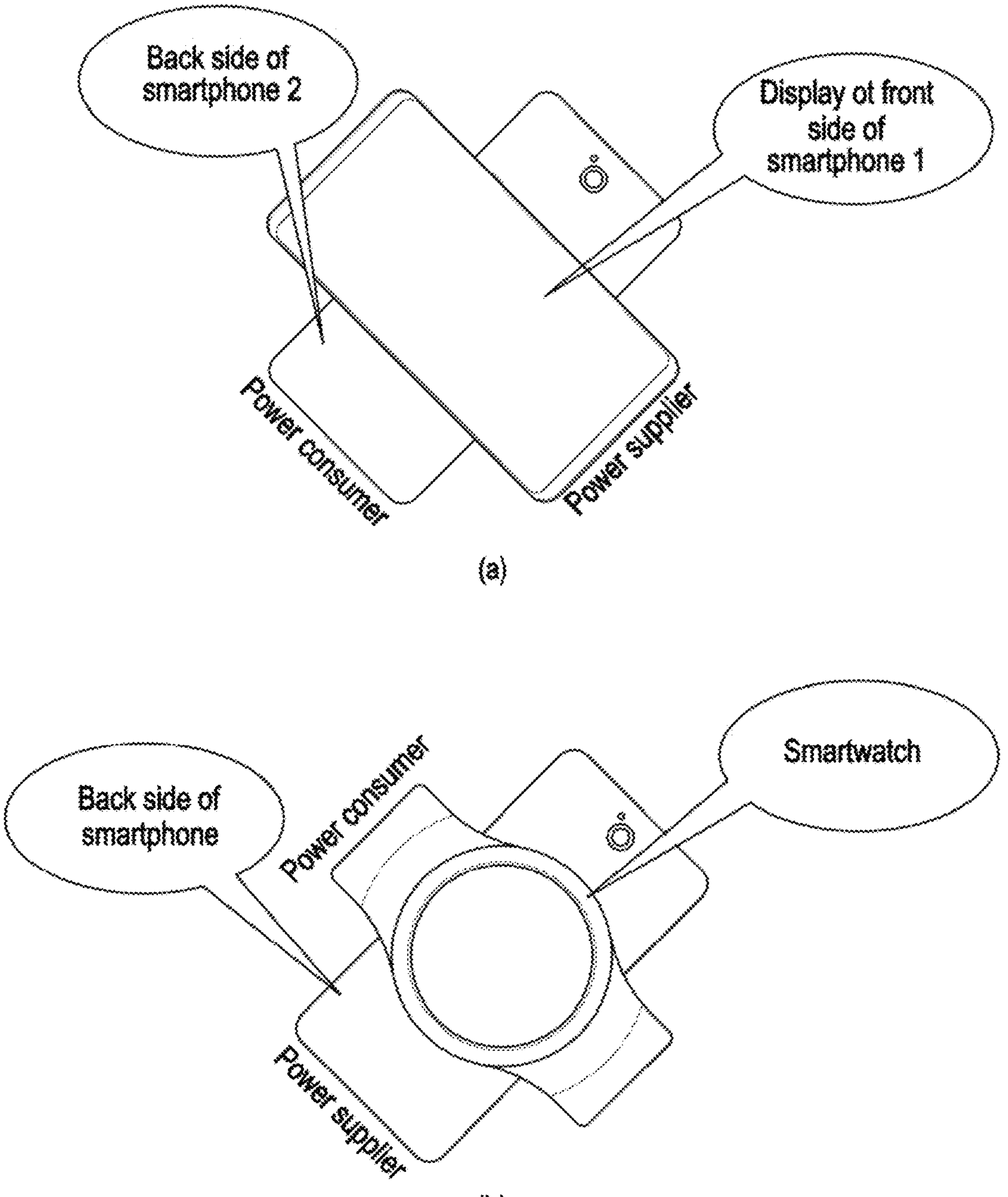
FIG. 1 illustrates a state-of-the-art scenario.

Further, skilled artisans will appreciate that elements in the drawings are illustrated for simplicity and may not have necessarily been drawn to scale. For example, the flow charts illustrate the method in terms of the most prominent steps involved to help to improve understanding of aspects of the present disclosure. Furthermore, in terms of the construction of the device, one or more components of the device may have been represented in the drawings by conventional symbols, and the drawings may show only those specific details that are pertinent to understanding the embodiments of the present disclosure to not to obscure the drawings with details that will be readily apparent to those of ordinary skill in the art having the benefit of the description herein.

DETAILED DESCRIPTION

FIGS. 2 through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The embodiments herein and the various features and advantageous details thereof are explained more fully with reference to the non-limiting embodiments that are illustrated in the accompanying drawings and detailed in the following description. Descriptions of well-known components and processing techniques are omitted to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analogy and/or digital circuits such as logic gates, integrated circuits, microprocessors, microcontrollers, memory circuits, passive electronic components, active electronic components, optical components, hardwired circuits and the like, and may be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are set out in the accompanying drawings. Although the terms first, second, etc. may be used herein to describe various elements, these elements should not be limited by these terms. These terms are generally used to distinguish one element from another.

Figure 2:
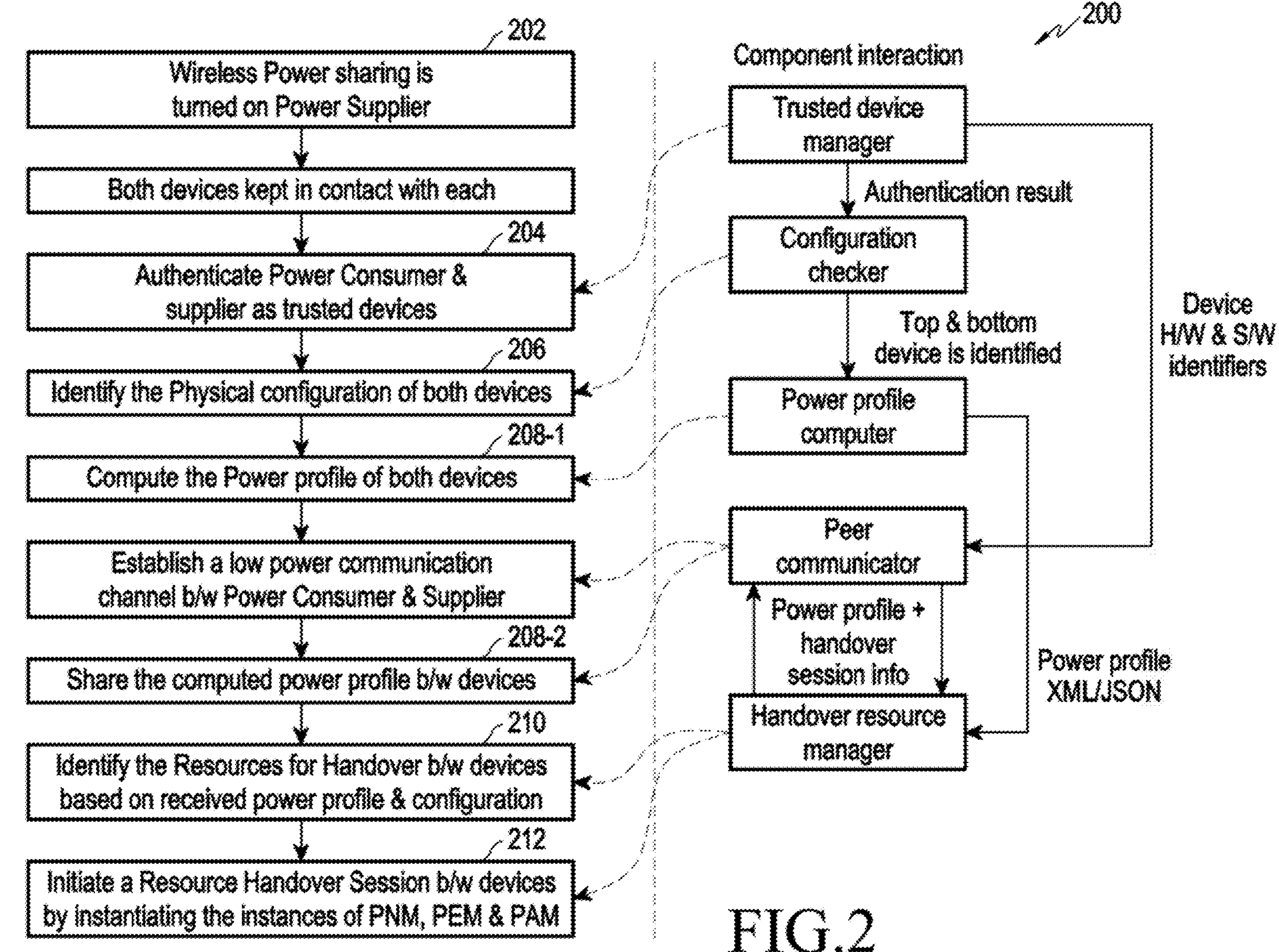
FIG. 2 illustrates a method in accordance with an embodiment as disclosed herein.

FIG. 2 illustrates a method in accordance with an embodiment of the present subject matter.

The present subject matter refers a method of optimized wireless power-sharing. The same includes initiating (202), between a first electronic device and a second electronic device, a wireless power sharing session as a power-supplier and power consumer. The wireless power sharing session is defined by the first device acting as a power supplier, and the second electronic device acting as a power consumer. At-least one of the first and second devices corresponds to a plurality of devices acting as either the power supplier or the power-consumer.

Further, the method includes mutually authenticating (204) the first with the second electronic device wirelessly by a trusted device manager. The mutual authentication includes performing, by the first and second electronic device, a mutual authentication wirelessly involving sharing & validating the identifiers of both electronic devices between each other.

Further, the method includes determining (206), by at least one of the first and second electronic device through a configuration checker, a physical disposition of the first and the second device as a part of the wireless power sharing. The determining of the physical disposition includes determining by at least one of the first and second electronic device, a respective physical configuration within a stacked arrangement of top & bottom device.

Further, the method includes computing (208), by at least one of the first and second electronic device, a respective power profile and transferring wirelessly the computed power profiles from the first to the second electronic device and/or vice versa. The computed power profile represents one or more of the average historical power usages & usage frequency of individual resources on hourly basis, an instantaneous drain rate; and current overall power levels. The computed power profile is transferred unidirectionally or bidirectionally between the first and second electronic device over a secure low power short range communication channel.

Further, the method includes identifying (210), by at least one of the first and second electronic device through a power profile computer, a plurality of computational resources eligible for handover based on artificial intelligence techniques and the received power profiles. An information is transferred wirelessly between the first and the second device through a peer communicator for triggering a handover of the identified computational resources.

The triggering of the handover includes initiating (212), by first and second electronic device through a resource handover manager, a resource sharing session between first and second electronic device. The information is transferred wirelessly as a handover information including a list of the identified computational resources between the first and the second device through the resource sharing session through the peer communicator.

In an example, the transfer is defined as transfer of the information of the identified computational resources from the first device to the second device, and transfer of the information of the identified computational resources from the second device to the first device.

Incoming events targeted for either first or second electronic device are executed by the first and the second electronic device, depending on resources handed over through the transfer of the information. The incoming events are executed individually by the first and the second device or in synchronization with each other based on the transferred information.

Figure 3:
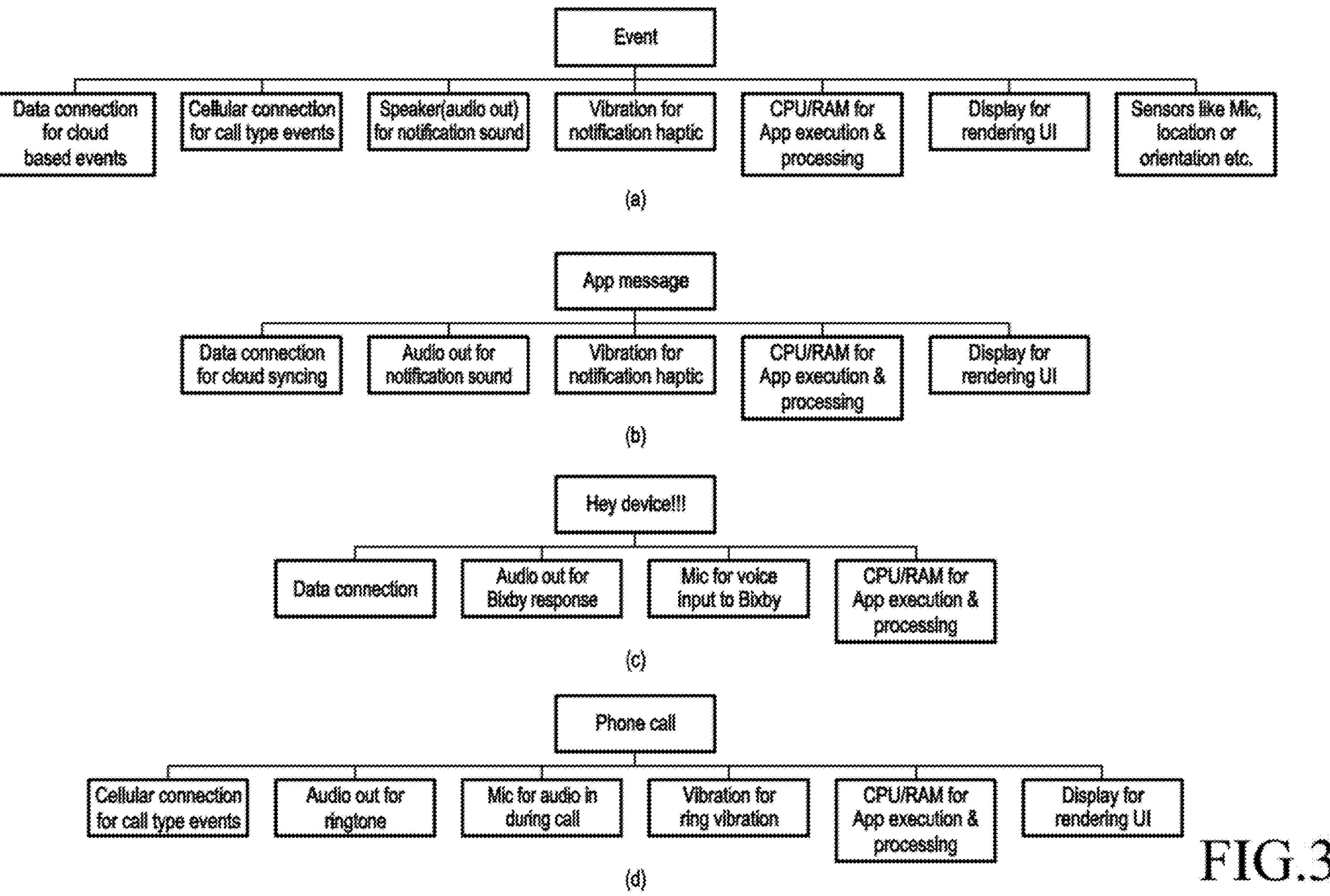
FIG. 3 illustrates resource requirements for a device event in accordance with an embodiment as disclosed herein.

FIG. 3 illustrates resource requirements for a device event. Resources used in device events & other type of background or foreground tasks can be broadly classified into 6 different types such as network, audio, sensors, haptic, CPU+RAM, and display. Examples of network resources include BT service, Wi-Fi service, data connection, cellular service. Example of audio resources includes speaker for audio output, mic for audio input. Examples of sensors include location sensors, inertial sensors, ambient lighting and fingerprint sensor. Examples of haptic sensors include vibration service for notifications, vibration service for touch response. Examples of CPU+RAM resources include isolated runtime environment for app execution, app sandboxing. Example of display sensors include a virtual wireless display for rendering UI content at runtime.

A normal event used many resources (for example the resources referred in (a) of FIG. 3) for its complete experience. (b) of FIG. 3 illustrates the resources used for an Application Message for its execution. (c) of FIG. 3 illustrates the resources used as a user uses “Hey Device” to wake up a voice-assistant device to perform the operation. (d) of FIG. 3 illustrates the resources used when a phone call arrives for answering the call.

Following table 1 illustrates the type of resources handed over from one device to another i.e., from Supplier to Consumer and vice versa based on a configuration.

TABLE 1

| Handover Type | Configuration - A When Consumer is on Top | Configuration - B When Supplier is on Top | Configuration - C When Consumer & Supplier both on Top (Only In case of Foldable devices) |
|---|---|---|---|
| Resources which Power Supplier (PSD) can provide to Power Consumer (PCD) | Network Resources<br>Audio Resources<br>Sensory Resources<br>Haptic Services<br>CPU + RAM for execution of individual PCD Apps | Network Resources<br>Audio Resources<br>Sensory Resources<br>Haptic Services<br>CPU + RAM for execution of individual PCD Apps<br>Display Resources | Network Resources<br>Audio Resources<br>Sensory Resources<br>Haptic Services<br>CPU + RAM for execution of individual PCD Apps<br>Display Resources |
| Resources which Power Consumer (PCD) can provide to Power Supplier (PSD) | Display Resources | None | None |

Figure 4:
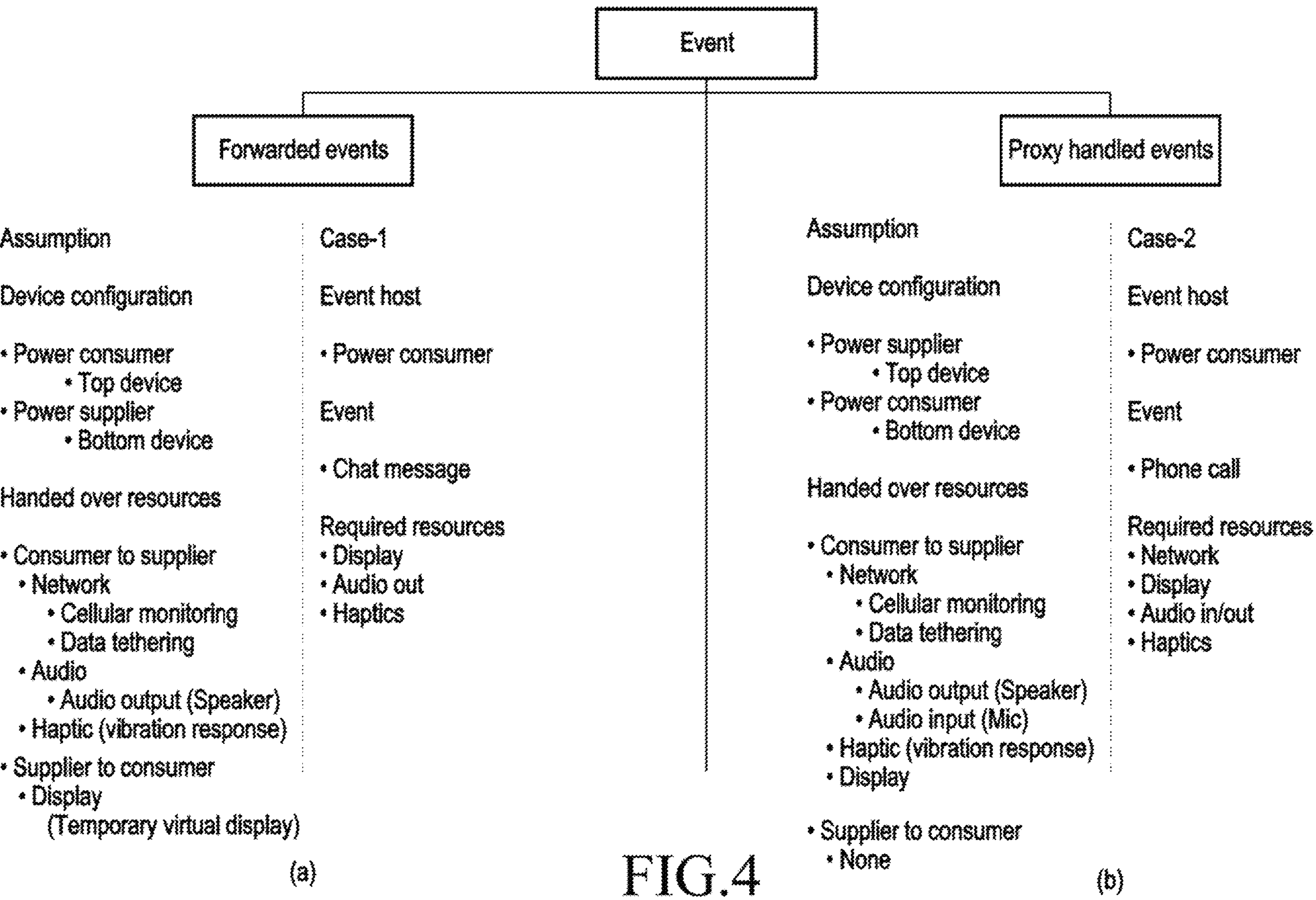
FIG. 4 refers the type of events as executed jointly or individually by the devices within the system in accordance with an embodiment as disclosed herein.

FIG. 4 refers the type of events as executed jointly or individually by the devices within the system. The events may be forwarded, or proxy handled events. Forwarded events are events for which partial event information is forwarded from host device to proxy device. Host device refers the device to which the event was targeted. Proxy device is the device to which the resources for an event are handed over.

(a) of FIG. 4 refers an example scenario of forwarded event wherein power consumer is top device and power supplier is bottom Device. As shown in (a) of FIG. 4, because display of consumer is not handed over to supplier, so audio out & haptic will be handled by supplier device. Display will be taken care by consumer device.

Proxy handled events are directly received on proxy device and host device plays no role to forward any information related to that event. (b) of FIG. 4 refers an example scenario of proxy handled event wherein the power supplier is top device and power consumer as bottom device. Because cellular monitoring resource of consumer is handed over to supplier, so the phone call is received on supplier directly with no role of consumer to forward that event. The supplier will handle it as if it is a local event and not a forwarded event.

Figure 5:
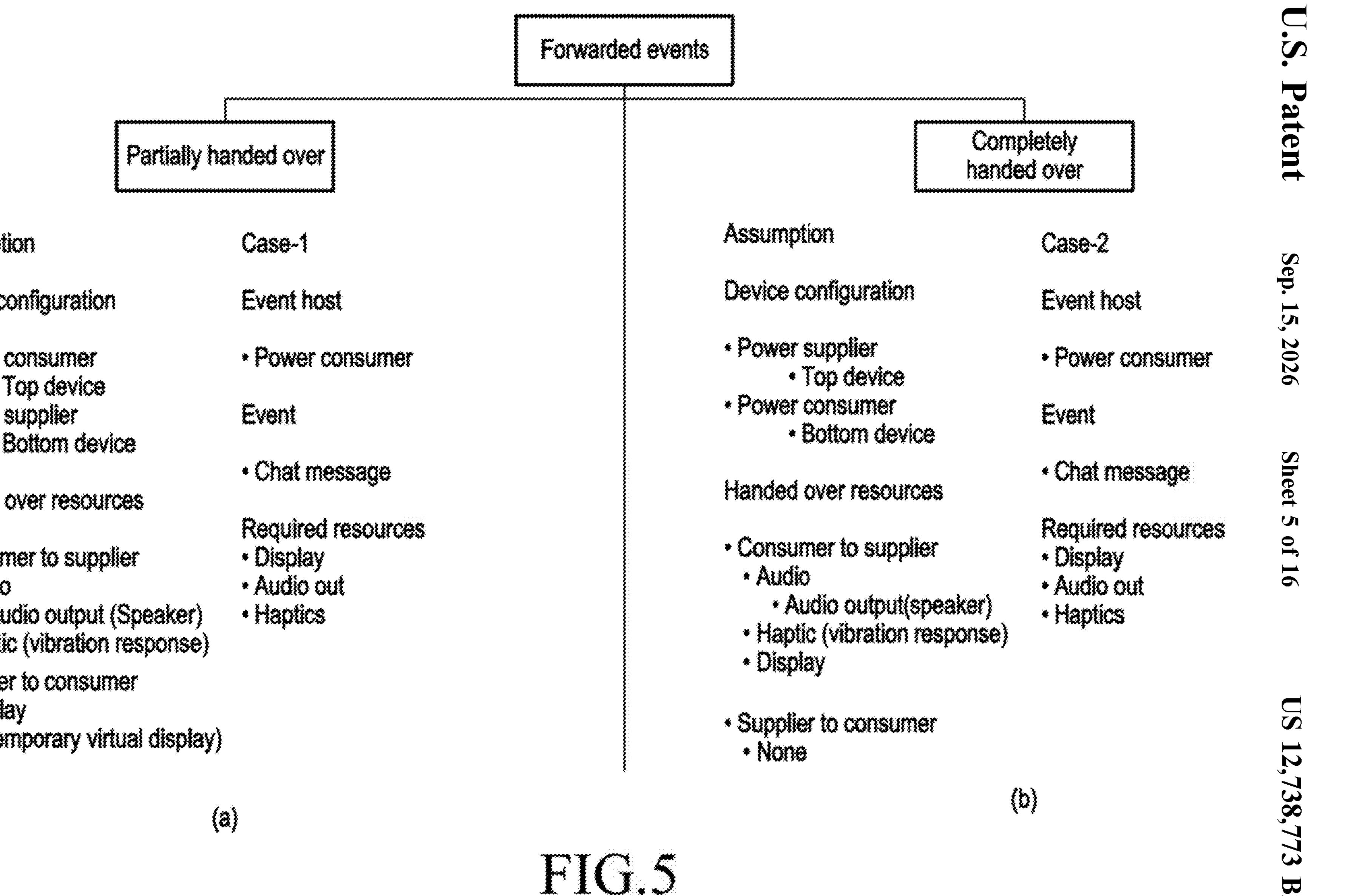
FIG. 5 refers the types of forwarded events in accordance with an embodiment as disclosed herein.

FIG. 5 refers the types of forwarded events as executed jointly or individually by the devices within the system.

(a) of FIG. 5 refers the partially handed over events for which the used resources are shared between both the devices and refers a scenario wherein the consumer is at the top and supplier is at the bottom. Because display of consumer is not handed over to supplier so Audio out & haptic will be handled by the supplier device & display will be taken care by consumer device.

(b) of FIG. 5 refers the complete handed over events for which the used resources are completely handed over from one device to another devices and refers a scenario wherein the consumer is at the top and supplier is at the bottom. Because display of consumer is also handed over to supplier so all the used resources for this event are handed over to the supplier.

Figure 6:
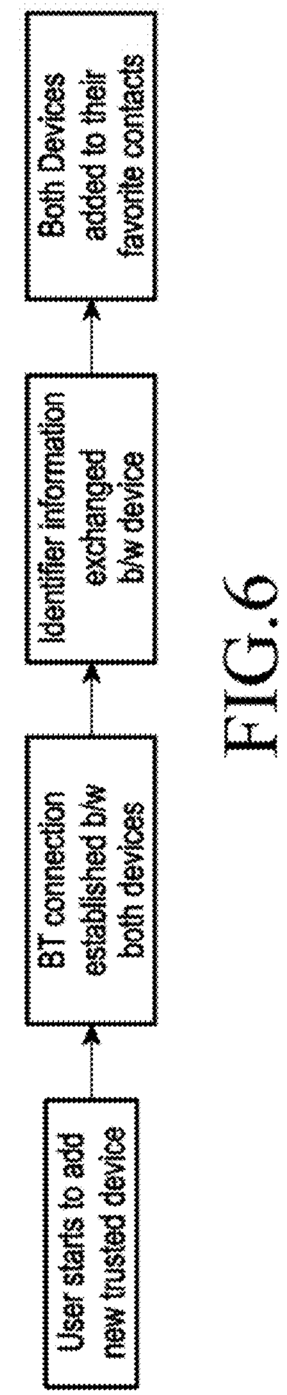
FIG. 6 illustrates a trusted device manager in accordance with an embodiment as disclosed herein.

FIG. 6 illustrates a trusted device manager (shown also in FIG. 12) implementing the mutually authenticating 204. Only trusted power pairs are allowed for resource handover to enable secure & authenticated handover. By default, if consumer & supplier both are in trustworthy contacts of each other then they are chosen as trusted device pair. User can add/delete/update the list of trusted power pair as per his/her choice. Trusted device manager performs the initial authentication when wireless power sharing is initiated. Following table 2 refers an encrypted information shared between trusted devices.

TABLE 2

| | |
|---|---|
| Wi-Fi/BT Identifier (MAC Address) | For Handling data communication channel & Data Tethering b/w PCD & PSD |
| NFC Identifier (UID) | For Handling event communication channel b/w PCD & PSD |
| Cellular Identifier (IMEI, IMSI, Operator Account ID & Auth Tokens) | For purpose of initiating number sharing and cellular function handling |
| Device Account ID (ID, Auth Tokens) | For authentication & synchronizing the device account related events |
| SNS Identifiers (ID, Auth Tokens) | For authentication & synchronizing of SNS accounts and fetching SnS events |

Figure 7:
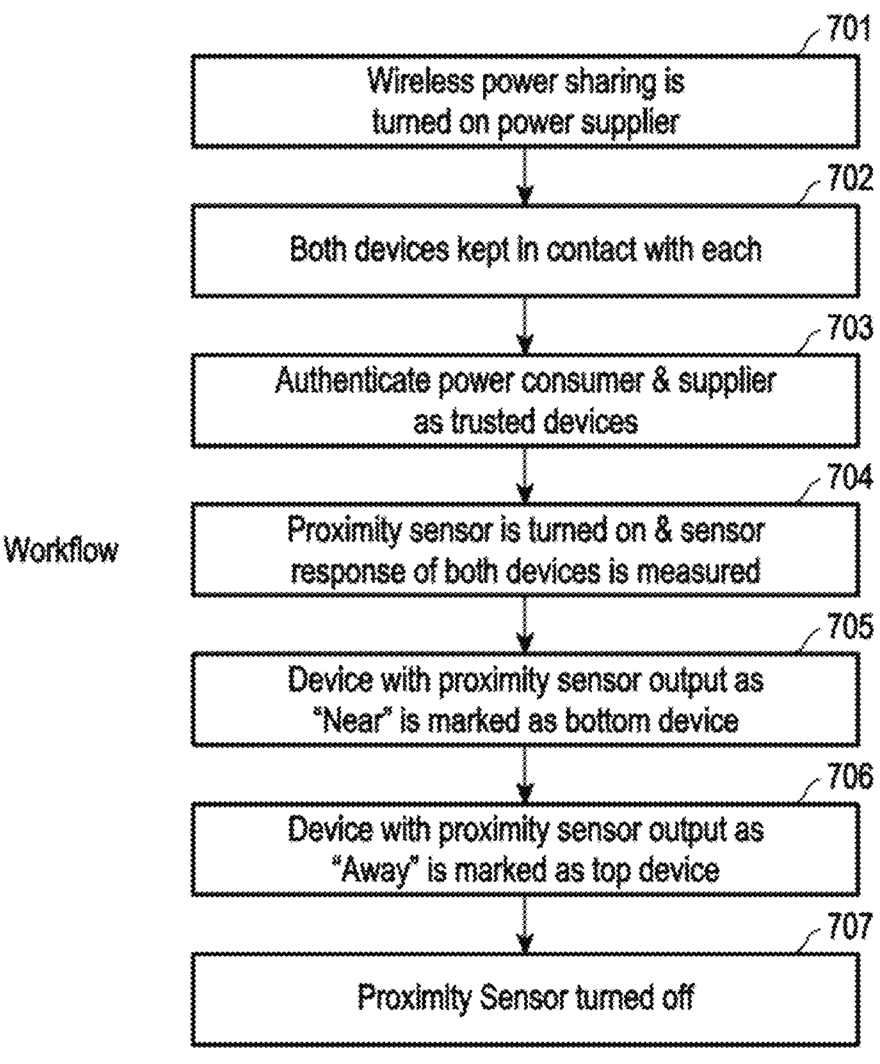
FIG. 7 illustrates configuration checker in accordance with an embodiment as disclosed herein.

FIG. 7 illustrates the configuration checker (shown also in FIG. 12) implementing the determining 206. The same identifies physical orientation of devices in power pair. This module decides which device is at the top and which device is at bottom. The same uses the Proximity Sensor to determine the physical configuration of devices.

Referring to FIG. 7, at operation 701, the wireless power sharing is turned on power supplier. At operation 702, both devices kept in contact with each. At operation 703, the power consumer and supplier is authenticated as the trusted devices. At operation 704, the proximity sensor is turned on and the sensor response of both devices is measured. At operation 705, the device with the proximity sensor output as "Near" is marked as a bottom device. At operation 706, the device with the proximity sensor output as "Away" is marked as a top device. At operation 707, the proximity sensor turned off.

Further, a power profile module (shown also in FIG. 12) implementing the computing 208 computes the hourly power usage of sharable resources of the device based on historical usage pattern averaged over pre-decided days. Unit of measurement may be mAh which represents the current consumed in an hour and is also used to represent battery capacity. A usage manager APIs of device operating system (OS) is used to keep the track of power consumption of each resource either software (S/W resource or H/W resource. For example, if current time is 6:10 PM, so the 15-day average historical consumption for each resource between 6:10 PM to 7:10 PM is computed.

As may be understood, the power profile of both devices in the pair keeps changing due to varying battery conditions such as battery charging, battery level rising or falling for consumer & supplier etc. Likewise, such variability may be contributed by other background resource utilization processes occurring within both of the devices, e.g., consumer and supplier. The same at-least ensures that handover process of the identifying 210 and the initiating 212 is a continuous operation and may be repeatedly triggered based on a new state of the paired devices as may be acquired due to aforesaid variability.

Figure 8:
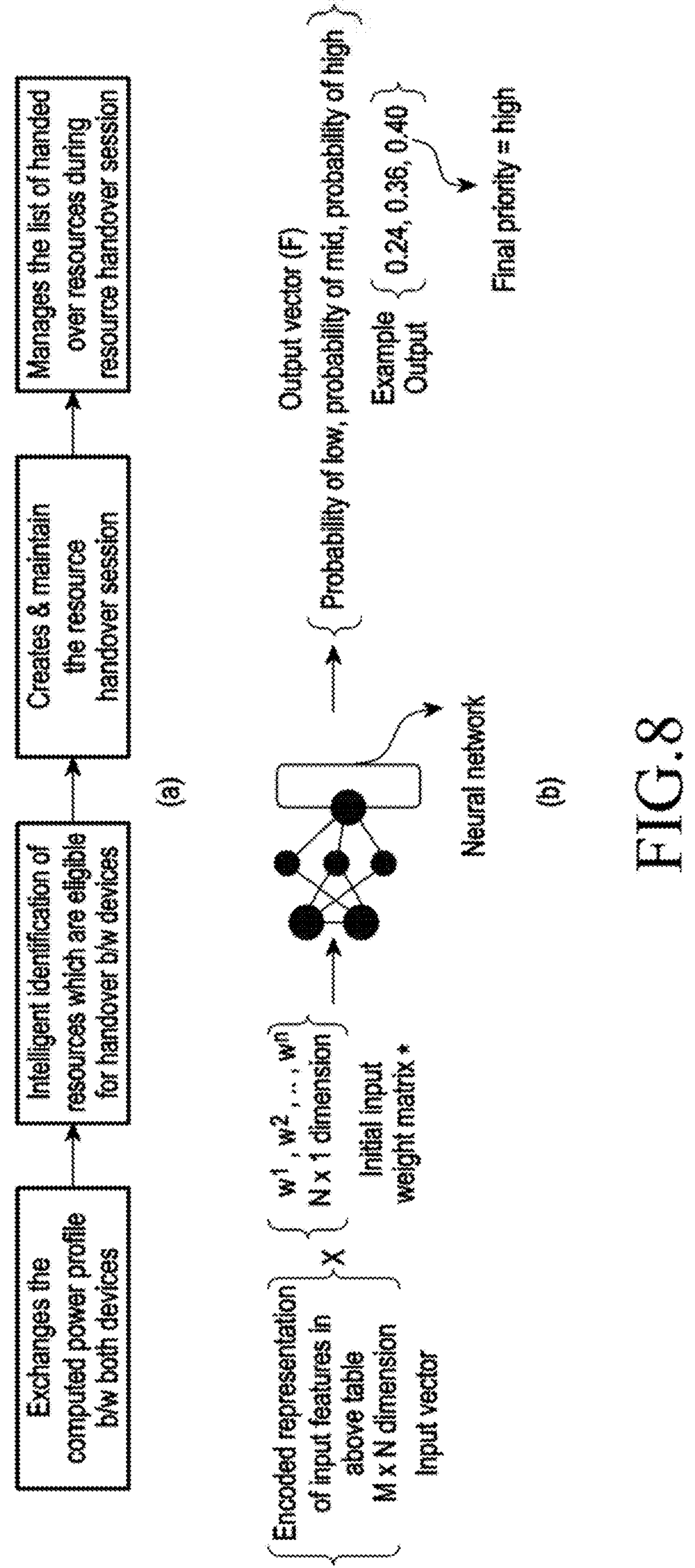
FIG. 8 illustrates a handover resource manager in accordance with an embodiment as disclosed herein.

FIG. 8 illustrates a handover resource manager (shown also in FIG. 12) implementing the identifying 210 and the initiating 212 for intelligent identification of handover resources, i.e., decision of what to handover. The handover process may be a continuous operation and may be repeatedly triggered based on a new acquired state of the paired devices as referred in the preceding description of FIG. 7.

(a) of FIG. 8 refers a neural network based classification of resource handover priority is provided wherein input features as listed below with respect to (b) of FIG. 8 will be categorically encoded & inputted to multi-layer neural network. The output layer of network uses a sigmoid function to give the probabilities of priority of handover. The class with highest probability (among low, mid or high), is taken as the final priority of that resource handover.

(b) of FIG. 8 and table 3 refers input features for Neural Network. However, such list of input features is in-exhaustive & more relevant features can be added to further increase decision accuracy of model.

TABLE 3

| Input Features for Neural Network List of input features is in-exhaustive & more relevant features can be added to further increase decision accuracy of model | | | | | | | | Output Label (Low, Mid, High) |
|---|---|---|---|---|---|---|---|---|
| PSD Current Battery Level | PCD Current Battery Level | PSD Last Hour Drain Rate | PCD Last Hour Drain Rate | Resource & Sub-Resource Type | Previous hour Usage Frequency | Historical Present Hour Usage Frequency | Historical Present Hour Power Requirements | Handover Priority |

PCD—Power Consumer Device
PSD—Power Supplier Device

Figure 9:
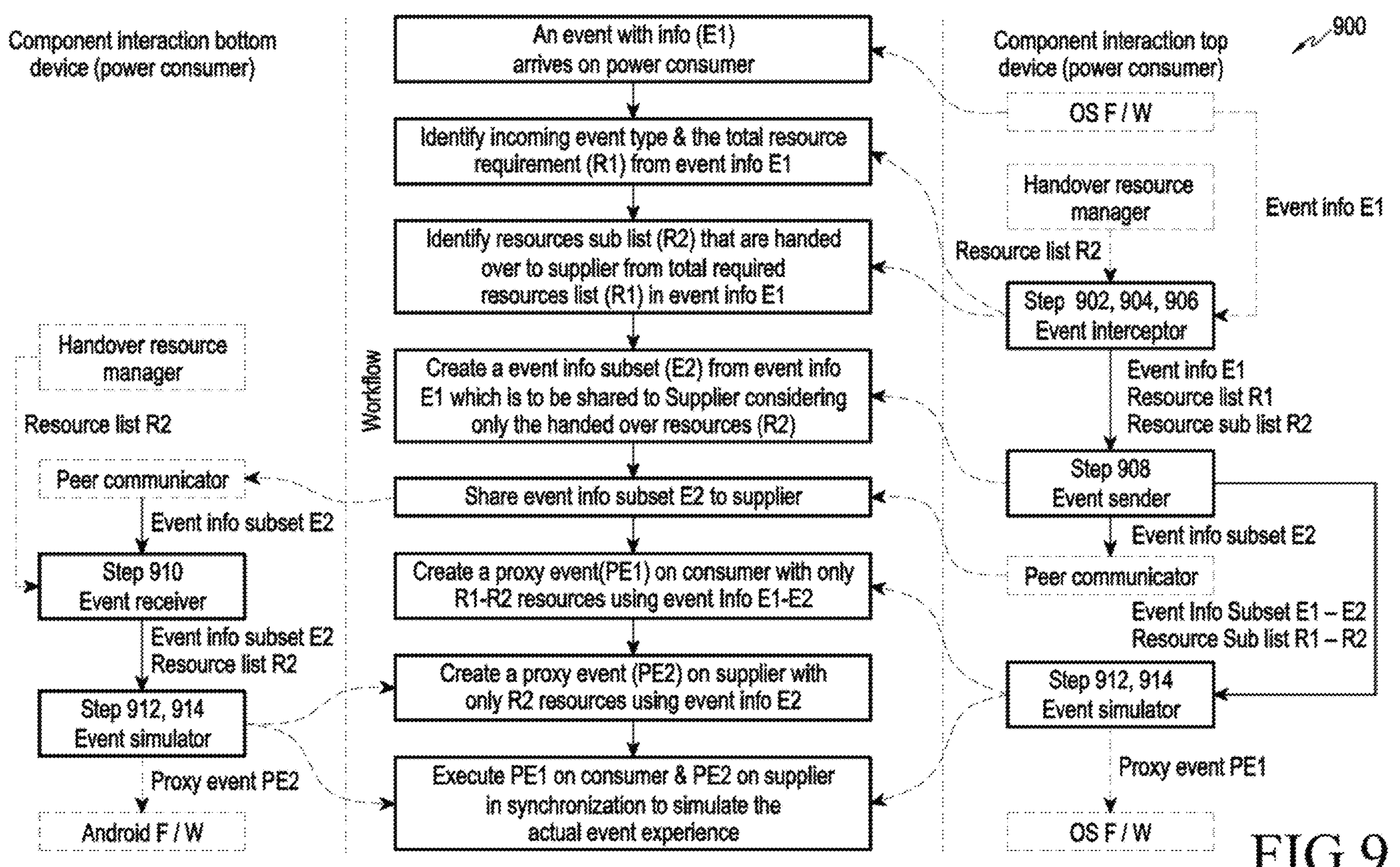
FIG. 9 refers event handling after handover in accordance with an embodiment as disclosed herein.

FIG. 9 refers event handling after handover in preceding description of FIG. 2 to FIG. 8 and accordingly refers a provisional event manager operation. The present subject matter refers a method of synchronized execution of the events by the one or more devices during wireless power sharing. As the handover process may be continuous operation and repeatedly triggered, the ensuing event handling after handover may also be in turn continuous.

The method includes detecting (902), by a first electronic device through an event interceptor, an incoming event and based thereupon determining information associated with the incoming event. The incoming event is defined by an interrupt or trigger either on operating system or on any installed application within the first device. In an embodiment, it may be determined by the first electronic device, whether the incoming event is targeted for the first electronic device or for the second electronic device based on the prior resource handover session as had occurred in preceding description of FIG. 2 to FIG. 6.

Further, the method includes determining by the first electronic device through an event interceptor, a number of computational resources used for executing the incoming event based on determining the information of event 904. The total resource requirement (R1) from event information E1 is gathered.

Further, the method includes determining by first electronic device through the event interceptor, partial resources out of the number of resources handed over to the second electronic device during a prior resource handover session 906. A resources sub list (R2) is identified that is handed over to supplier from total used resources list (R1) in event info E1. Accordingly, the remaining resources upon handing over R2 from the total resource R1 is referred as 'R1-R2'.

Further, the method includes computing (908), by the first electronic device through the event interceptor and an event sender, a first partial event information out of the determined event information, said first partial event information used for executing the determined partial resources handed over to the second electronic device. An event info subset (E2) is created from event info E1 which is to be shared to supplier considering only the handed over resources (R2). Accordingly, the remaining event information upon sharing E2 from the total information E1 is referred as "E1-E2".

Further, the method includes transferring (910), by the first electronic device, the first partial event information to the second electronic device through an event sender. The event information subset E2 is shared with supplier. The partial information is transferred on a secured low power short range communication channel.

Further, the method includes creating (912), by at least one of the first and the second electronic device through an event receiver and an event simulator, a proxy event instance for at least one of the first and second devices. The proxy instance represents a partial version of the incoming event and is associated with one or more of:

(a) in respect of the first device, the proxy instance is associated a second partial event information out of the determined event information. When the supplier is at the bottom and the consumer is at the top, a proxy event (PE1) is created on consumer with only R1-R2 resources using event information E1-E2. In case of opposite configuration, however no proxy event is created on the consumer.

(b) in respect of the second electronic device, the proxy instance is associated with the first partial event information. Irrespective of the type of configuration, a proxy event (PE2) is created on supplier with only R2 Resources using event info E2.

Further, the method includes executing (914) the incoming event by an individual execution of the partial event by either the first or the second electronic device through the event simulator. Especially, when the supplier is at the bottom and the consumer is at the top, a synchronized execution of the proxy events at both the first and second electronic device results in a combined event execution. Accordingly, the proxy events are executed such that PE1 is on consumer & PE2 on supplier in synchronization to simulate the actual event experience. When the supplier is at the top and the consumer is at the bottom, then the partial event is executed only by the supplier.

In an example scenario of a chat message arrival, it may be assumed that event host for the chat message arrival is power consumer. The device configuration may be such that Power Consumer: Top Device, Batt: 10%, 1.4 GHz (4 Core), 4 GB RAM Power Supplier: Bottom Device, Batt: 50%, 1.4 GHz (8 Core), 8 GB RAM The handed over resources based on the power profile may be as follows:

Consumer to Supplier

Network

Data Tethering

Audio

Audio Output (Speaker)

Audio Input (Mic)

Haptic (Vibration response)

Supplier to Consumer

Display (Temporary Virtual display).

Accordingly, power consumption related to event ringtone & vibration is saved at the power consumer.

In another example scenario of phone call arrival in similar configuration, the handed over resources considering power profile are as follows Consumer to Supplier Network Data Tethering Audio Audio Output (Speaker)

Audio Input (Mic)

Haptic (Vibration response)

Supplier to Consumer

Display (Temporary Virtual display)

Accordingly, power consumption related to Event Ringtone, Vibration, Microphone Usage & Device Speaker is saved. The user experience is also maintained because ringtone & vibration pattern of consumer is played on supplier.

Figure 10:
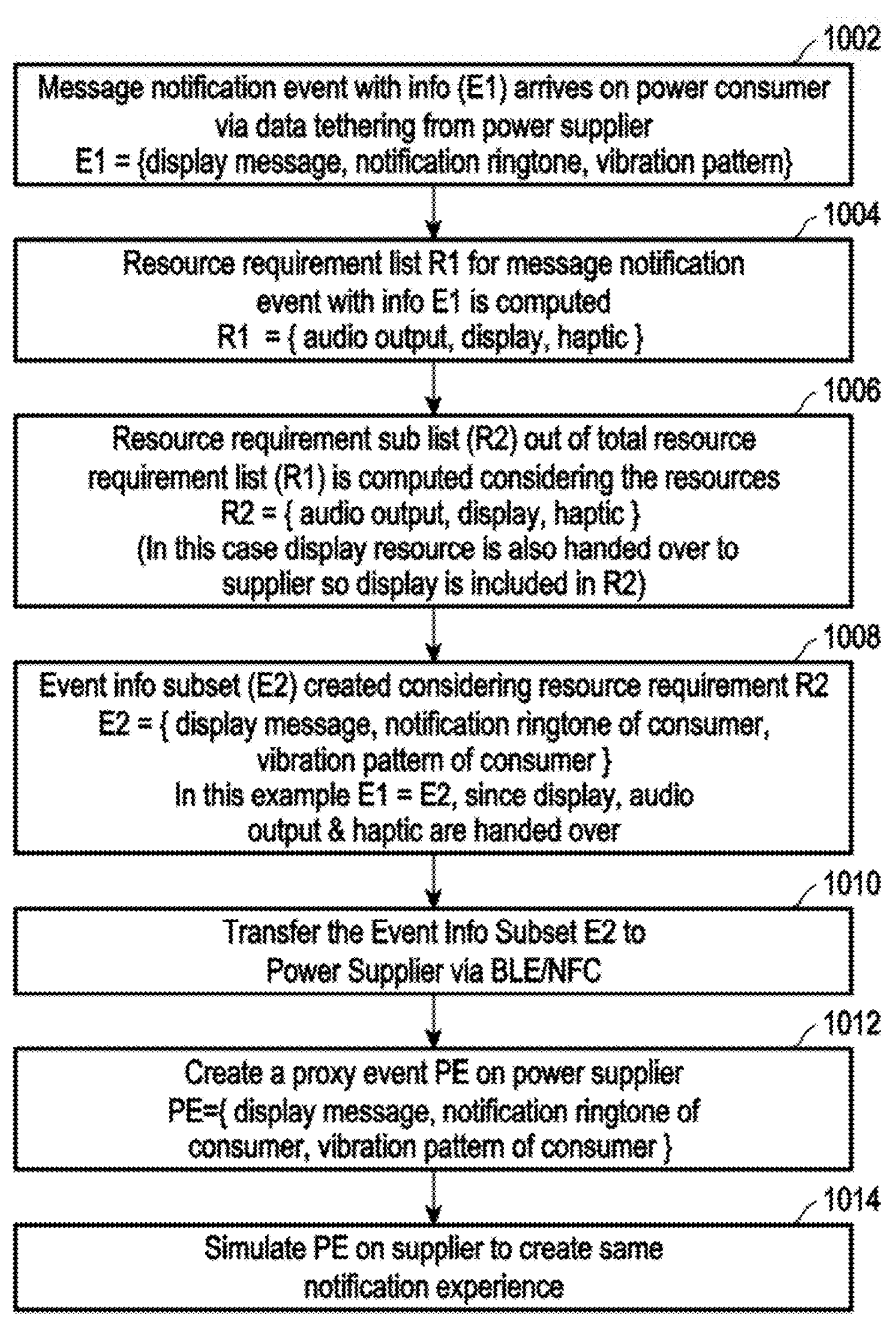
FIG. 10 refers the event manager operation in accordance with an embodiment as disclosed herein.

FIG. 10 refers the event manager operation of FIG. 9 and refers an example embodiment of a chat message arrival wherein the first device corresponds to a lower device in a stacked arrangement as a power consumer device and the second device corresponding to the power supplier is provided at the top.

Operations 1002 till 1010 correspond to operations 902 till 910. The example embodiment of a chat message arrival of FIG. 10 may include detecting 1002, a first determining

1004, a second determining 1006, computing 1008, and transferring 1010. Following are the example parameters:

$$E1 = \{\text{Display Message, Notification Ringtone, Vibration Pattern}\}$$

$$R1 = \{\text{Audio Output, Display, Haptic}\}$$

$$R2 = \{\text{Audio Output, Display, Haptic}\}$$

$$E2 = \{\text{Display Message, Notification Ringtone of Consumer, Vibration Pattern of Consumer}\}$$

The method includes creating (1012) solely by the second electronic device the proxy event instance as a power supplier, said proxy instance representing a partial version of the incoming event and associated with the first partial event information. A Proxy Event PE is created on Power Supplier, such that PE={Display Message, Notification Ringtone of Consumer, Vibration Pattern of Consumer}.

The method includes executing (1014) the proxy event PE as created upon the supplier device. The proxy event PE is simulated on supplier to create same notification experience.

In an example scenario of chat message arrival, the Event Host is Power Consumer. The device configuration is as follows:

Power Supplier
- Top Device, Batt: 50%
- 1.4 GHz (4 Core), 4 GB RAM

Power Consumer
- Bottom Device, Batt: 10%
- 1.4 GHz (8 Core), 8 GB RAM

The handed over resources based on the power profile are as follows

Consumer to Supplier
- Network
- Data Tethering
- Audio
- Audio Output (Speaker)
- Audio Input (Mic)
- Haptic (Vibration response)
- Display Supplier to Consumer is NULL As a result, the power consumption related to Event Display, Ringtone & Vibration is saved. Accordingly, the complete event of consumer is handled here by the supplier and the user experience is also maintained because ringtone & vibration pattern of consumer is played on supplier.

Figure 11:
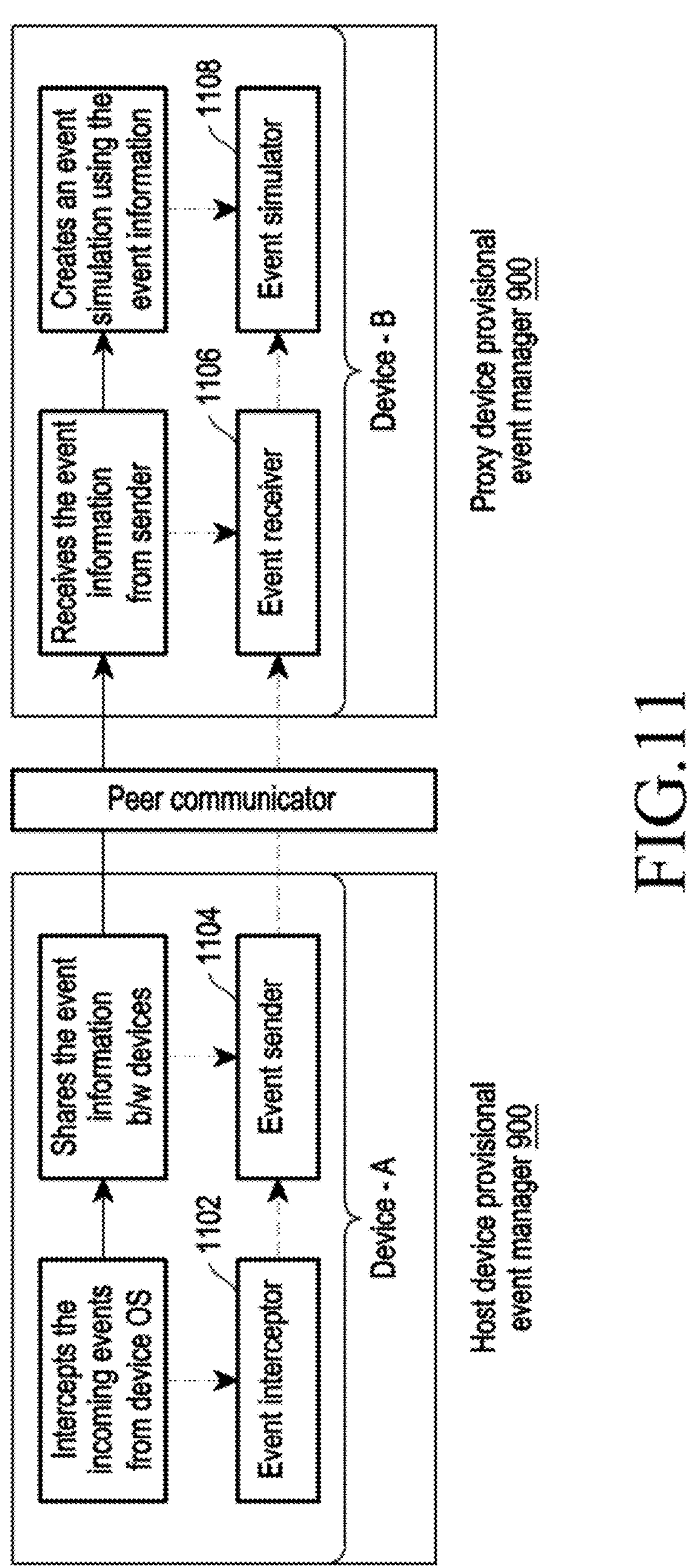
FIG. 11 refers a provisional event manager operation through the constituent elements in accordance with an embodiment as disclosed herein.

FIG. 11 refers a provisional event manager 900 operation through the constituent elements such as Event interceptor 1102, Event sender 1104, Event receiver 1106 and Event simulator 1108.

Event interceptor 1102 implements the operations 1002 till 1006. It intercepts the incoming event, identifies the event type as forwarded event or proxy handled event. Thereafter, the event sub type is decided as partially handed over event or completely handed over event.

Event sender 1104 implements the computing 1008 and shares the event information with the proxy device via peer communicator. The event sender interacts with event interceptor of host device for getting event information and interacts with event simulator of host device for executing one part of partially handed over event.

Event receiver 1106 implements the transferring 1010 and receives the event info from host device via a peer communicator. It interacts with event simulator of proxy device for executing second part of partially handed over event.

Event simulator 1108 implements the operations 1012 and 1014 and interacts with the actual resources of device to simulate the event. The same uses signaling for synchronizing the simulated events in case of partially handed over event. The simulator includes logic to actuate the event on H/W resources like speaker, mic, vibration, display, sensors etc.

Figure 12:
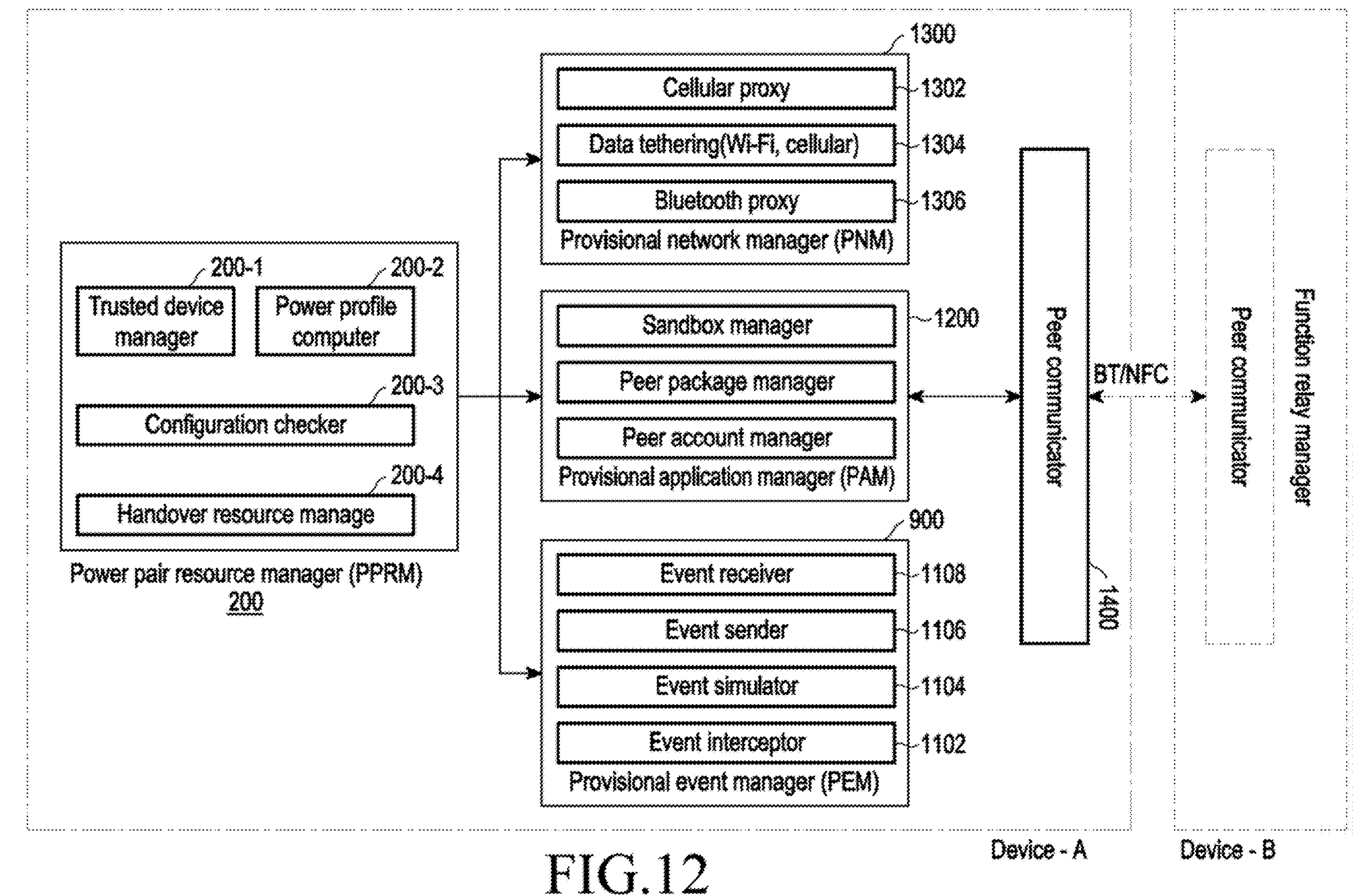
FIG. 12 illustrates a system architecture in accordance with an embodiment as disclosed herein.

FIG. 12 illustrates a system architecture underlying the present subject matter. The system includes a power pair resource manager (PPRM) 200 implementing the initiating 202 through initiating 212, an event manager (PEM) 900 implementing the operations 1002 till 1014, an application manager (PAM) 1200, a network manager (PNM) 1300 and a peer communicator 1400.

The operation of PPRM corresponds to the description of FIGS. 2 to 8 while operation of PEM corresponds to the description of FIGS. 9 to 11.

PAM 1200 is used in cases when CPU+RAM (processing) resources are provided by proxy device to the host device for selected applications. At least a purpose of PAM is to perform the Installation, execution & account maintenance of the host device application in a sandboxed environment.

PNM 1300 handles the overall networking requirements of host device on proxy device during handover session. Its constituent component cellular proxy 1302 handles the SIM related operations of host device on proxy device. The same acts as a runtime proxy of cellular activities of host device (if cellular resources are eligible for handover). It uses a known concept of number sharing to create a temporary SIM profile of host device on proxy device. After the successful handover of cellular functions, call & SMS events targeted for host device will be directly received on proxy device. Cellular radio of the host device will be turned inactive during the handover session to save power.

Another constituent component of PNM which is "data tethering" 1304 provides data connection to host device during the handover session. The same creates a runtime data hotspot either using Wi-Fi or cellular data connection on the proxy device. Tethering can be created either over BT or over Wi-Fi hotspot (whichever provides low power connection). The applications on host device which are not handed over to proxy device might use data connection for their functioning, which is catered using data tethering module of proxy device.

Another constituent component of PNM which is "bluetooth proxy" 1306 handles the connections & events with host BT companions like smartwatch. If the BT companion resources are eligible for handover for a session, then the connections with host companions are temporarily handled by proxy device. A temporary connection with companions is established and all the companion events are directly handled by the proxy device during the handover session.

Peer communicator 1400 manages the low-level handover related communication between host device & proxy device. All the components PPRM, PEM, PNM, PAM talk to their proxies on other device via peer communicator 1400. The peer communicator 1400 uses a low power NFC or BLE based communication channel for communication. The communication channel is encrypted with a standard AES or state of art encryption scheme.

Figure 13:
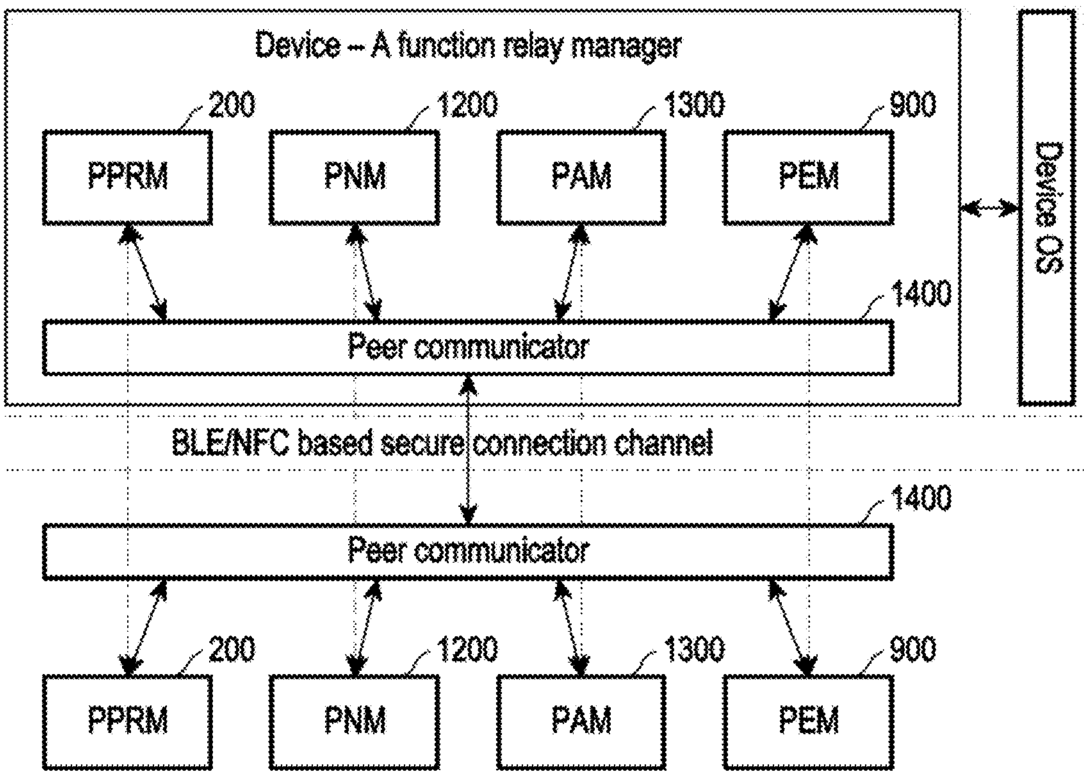
FIG. 13 illustrates an operation of the peer communication between two devices in accordance with an embodiment as disclosed herein.

FIG. 13 illustrates an operation of the peer communication between two devices. The following table 4 summarizes the operation of peer communicator 1400.

TABLE 4

| Component | Peer Communicator Functions |
|---|---|
| PPRM | Power Profile Exchange<br>Trusted Device Identifiers Exchange<br>Handover information |
| PEM | Partial & Complete Event Info<br>Event Synchronization Handshaking |
| PAM | Handover Application Info<br>Runtime permission info of Apps<br>App state handshaking post handover |
| PNM | Cellular operation sync post handover<br>Companion info exchange<br>Data Tethering connection access info |

Figure 14:
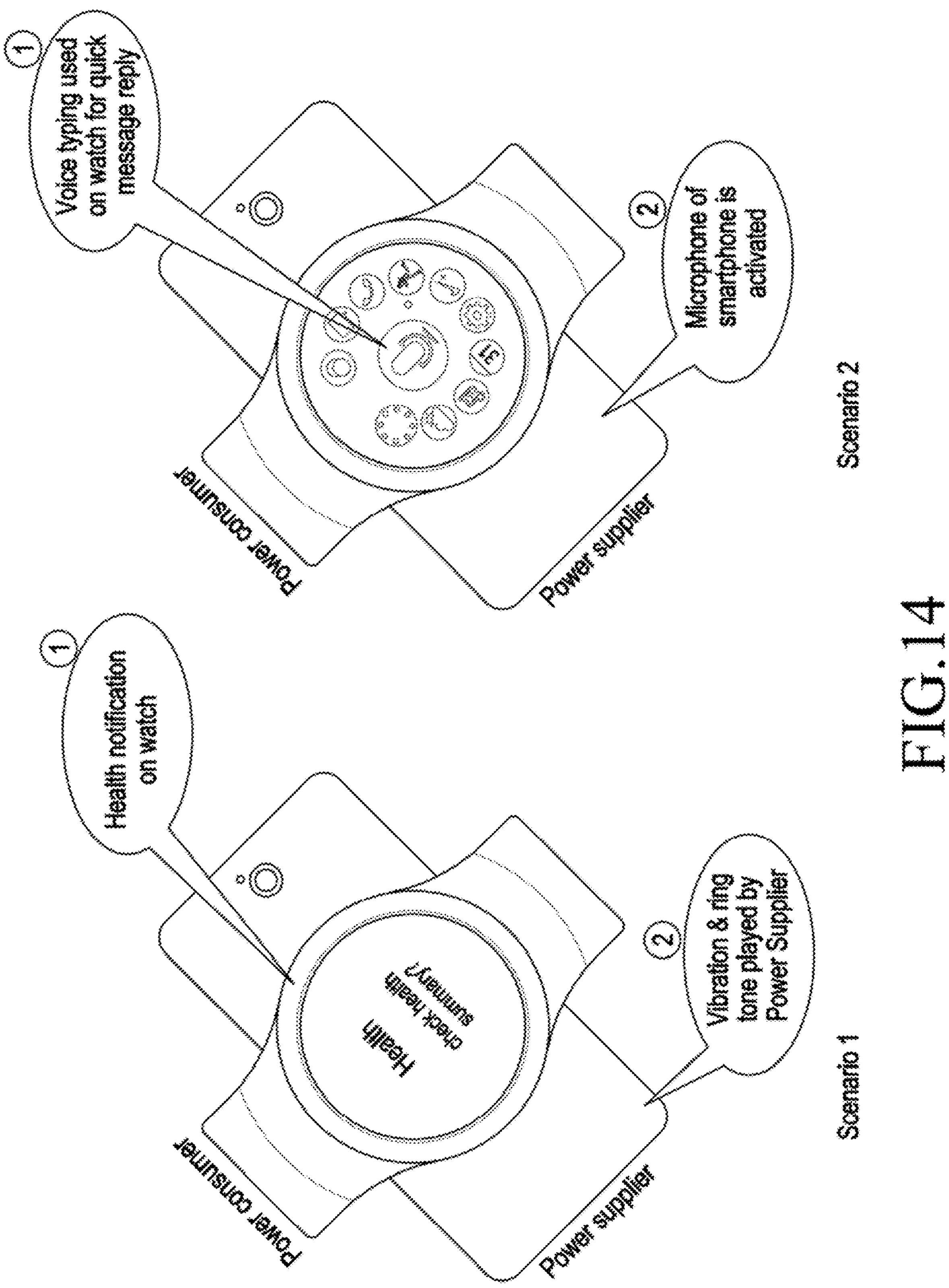
FIG. 14 illustrates a collaborative working scenario in accordance with an embodiment as disclosed herein.

FIG. 14 illustrates a collaborative working scenario of partially handed over event (scenario 1) & application sandboxing (scenario 2) through PAM.

The list of watch resources which are handed to phone in scenarios 1 & 2 include audio (speaker & microphone), data connection, vibration (haptics), sandboxed environment (CPU+RAM) for voice typing app of watch is provided by smartphone. In scenario 2, CPU+RAM Resources are provided by phone to watch.

When notification is received on power consumer (watch), notification ringtone is handled by power supplier (phone). Vibration is handled by power supplier (phone) and data connection for cloud syncing is provided by power supplier (phone).

When quick reply is composed on power consumer (watch), microphone of power supplier (phone) is used for voice typing. Processing resources of running the voice typing app is taken care by power supplier (phone). Only UI rendering of voice typing app is done by power consumer (watch. data connection of power supplier (phone) is used for speed recognition (speech to text).

Figure 15:
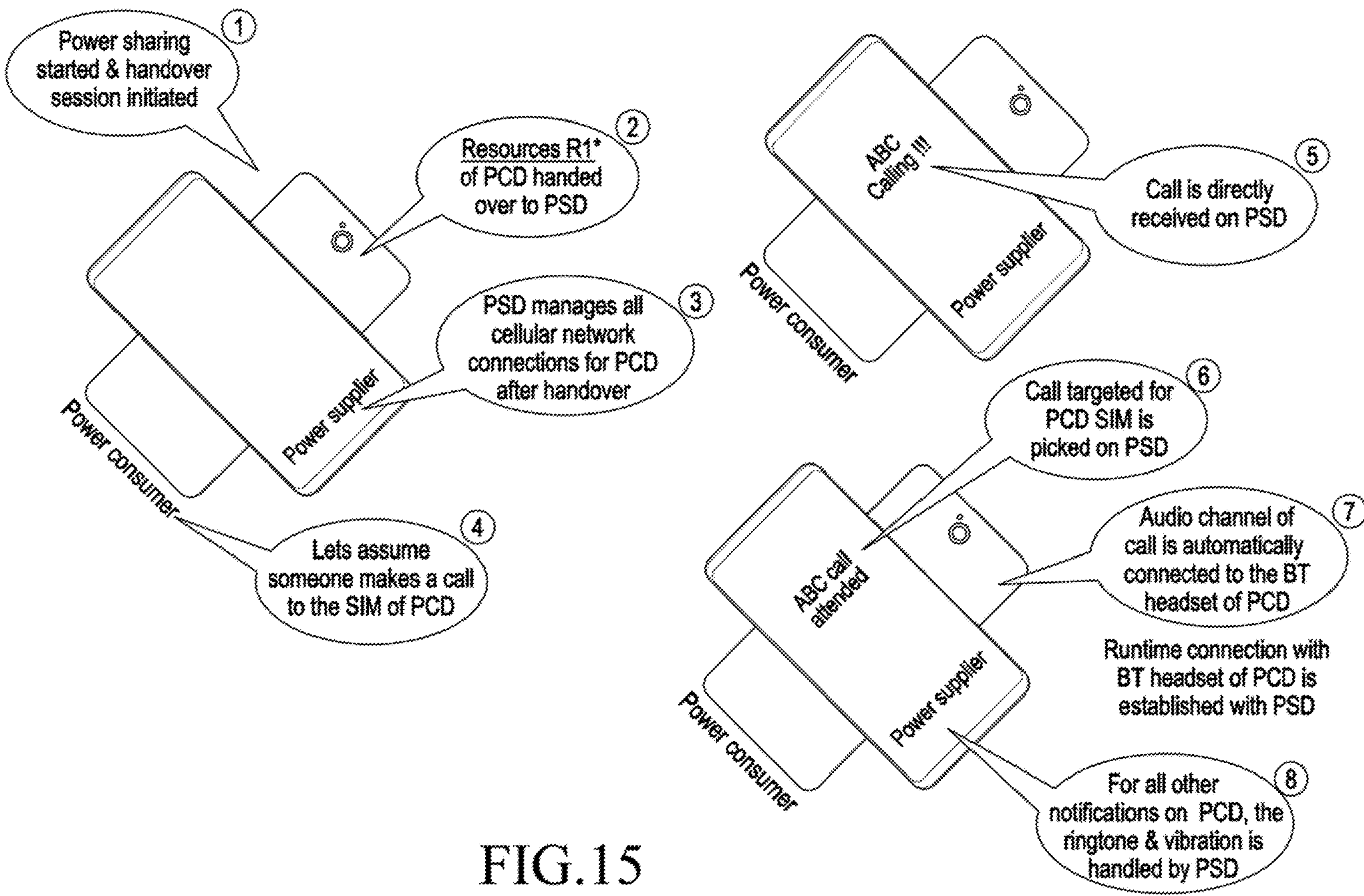
FIG. 15 illustrates another collaborative working scenario in accordance with an embodiment as disclosed herein.

FIG. 15 illustrates collaborative working scenario of proxy handled events wherein a call is answer when complete cellular service is handed over. List of bottom smartphone resources which are handed to top smartphone in this use case include cellular services (number sharing), audio output, vibration, audio input, display, data connection and BT headset.

Accordingly, all resources used for incoming call (cellular radio/modem, CPU+RAM, audio in/out, display) are handled by power supplier. BT headset of power consumer is automatically handed over to power supplier when call is accepted. There is observed no impact on end user experience and yet power consumption is reduced on power consumer. In addition, misalignment is avoided compared traditional method of attending or rejecting the call on power consumer.

Figure 16:
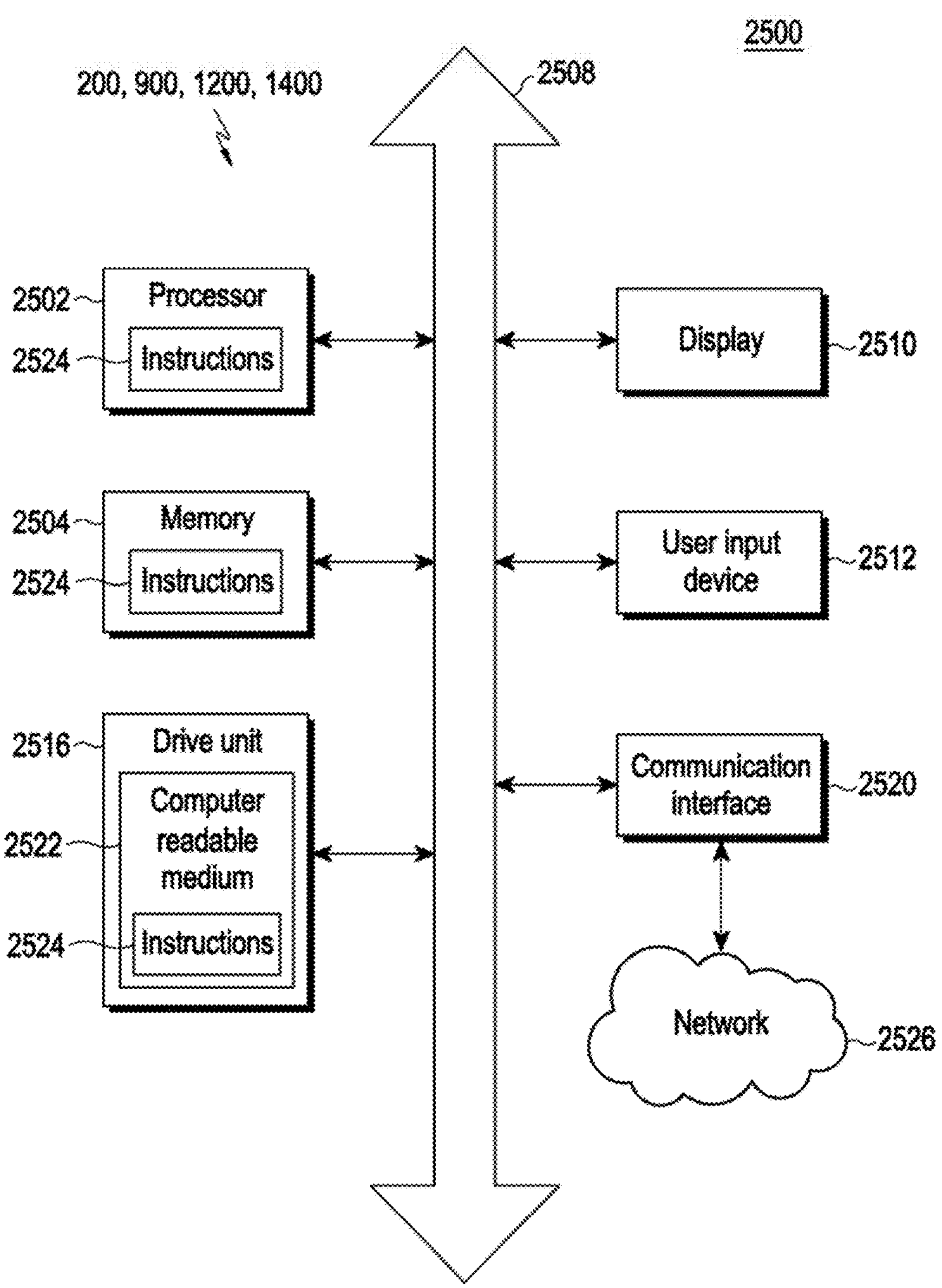
FIG. 16 illustrates yet another exemplary implementation in accordance with the embodiment as disclosed herein.

FIG. 16 illustrates yet another exemplary implementation in accordance with the embodiment of the disclosure, and yet another hardware configuration of device 200, provisional event manager 900, PAM 1200, PNM 1300 and peer communicator 1400 in the preceding figures through a computer system 2500. The computer system 2500 can include a set of instructions that can be executed to cause the computer system 2500 to perform any one or more of the methods disclosed. The computer system 2500 may operate as a standalone device or may be connected, e.g., using a network, to other computer systems or peripheral devices.

In a networked deployment, the computer system 2500 may operate in the capacity of a server or as a client user computer in a server-client user network environment, or as a peer computer system in a peer-to-peer (or distributed) network environment. The computer system 2500 can also be implemented as or incorporated across various devices, such as a personal computer (PC), a tablet PC, a personal digital assistant (PDA), a mobile device, a palmtop computer, a laptop computer, a desktop computer, a communications device, a wireless telephone, a land-line telephone, a web appliance, a network router, switch or bridge, or any other machine capable of executing a set of instructions (sequential or otherwise) that specify actions to be taken by that machine. Further, while a single computer system 2500 is illustrated, the term "system" shall also be taken to include any collection of systems or sub-systems that individually or jointly execute a set, or multiple sets, of instructions to perform one or more computer functions.

The computer system 2500 may include a processor 2502 e.g., a central processing unit (CPU), a graphics processing unit (GPU), or both. The processor 2502 may be a component in a variety of systems. For example, the processor 2502 may be part of a standard personal computer or a workstation. The processor 2502 may be one or more general processors, digital signal processors, application-specific integrated circuits, field-programmable gate arrays, servers, networks, digital circuits, analog circuits, combinations thereof, or other now known or later developed devices for analyzing and processing data. The processor 2502 may implement a software program, such as code generated manually (i.e., programmed).

The computer system 2500 may include a memory 2504, such as a memory 2504 that can communicate via a bus 2508. The memory 2504 may include but is not limited to computer-readable storage media such as several types of volatile and non-volatile storage media, including but not limited to random access memory, read-only memory, programmable read-only memory, electrically programmable read-only memory, electrically erasable read-only memory, flash memory, magnetic tape or disk, optical media and the like. In one example, memory 2504 includes a cache or random-access memory for the processor 2502. In examples, the memory 2504 is separate from the processor 2502, such as a cache memory of a processor, the system memory, or other memory. The memory 2504 may be an external storage device or database for storing data. The memory 2504 is operable to store instructions executable by the processor 2502. The functions, acts or tasks illustrated in the figures or described may be performed by the programmed processor 2502 for executing the instructions stored in the memory 2504. The functions, acts or tasks are independent of the type of instructions set, storage media, processor or processing strategy and may be performed by software, hardware, integrated circuits, firmware, micro-code and the like, operating alone or in combination. Likewise, processing strategies may include multiprocessing, multitasking, parallel processing, and the like.

As shown, the computer system 2500 may or may not further include a display unit 2510, such as a liquid crystal display (LCD), an organic light-emitting diode (OLED), a flat panel display, a solid-state display, a cathode ray tube (CRT), a projector, a printer or other now known or later developed display device for outputting determined information. The display unit 2510 may act as an interface for the user to see the functioning of the processor 2502, or as an interface with the software stored in the memory 2504 or the drive unit 2516.

Additionally, the computer system 2500 may include an input device 2512 configured to allow a user to interact with any of the components of computer system 2500. The computer system 2500 may also include a disk or optical drive unit 2516. The drive unit 2516 may include a computer-readable medium 2522 in which one or more sets of instructions 2524, e.g., software, can be embedded. Further, the instructions 2524 may embody one or more of the methods or logic as described. In an example, the instructions 2524 may reside completely, or at least partially, within the memory 2504 or within the processor 2502 during execution by the computer system 2500.

The present disclosure contemplates a computer-readable medium that includes instructions 2524 or receives and executes instructions 2524 responsive to a propagated signal so that a device connected to a network 2526 can communicate voice, video, audio, images, or any other data over the network 2526. Further, the instructions 2524 may be transmitted or received over the network 2526 via a communication port or interface 2520 or using a bus 2508. The communication port or interface 2520 may be a part of the processor 2502 or maybe a separate component. The communication port or interface 2520 may be created in software or maybe a physical connection in hardware. The communication port or interface 2520 may be configured to connect with a network 2526, external media, the display unit 2510, or any other components in computer system 2500, or combinations thereof. The connection with the network 2526 may be a physical connection, such as a wired Ethernet connection or may be established wirelessly as discussed later. Likewise, the additional connections with other components of the computer system 2500 may be physical or may be established wirelessly. The network 2526 may be directly connected to the bus 2508.

The network 2526 may include wired networks, wireless networks, Ethernet AVB networks, or combinations thereof. The wireless network may be a cellular telephone network, an 802.11, 802.16, 802.20, 802.1Q or WiMax network. Further, the network 2526 may be a public network, such as the Internet, a private network, such as an intranet, or combinations thereof, and may utilize a variety of networking protocols now available or later developed including, but not limited to TCP/IP based networking protocols. The system is not limited to operation with any standards and protocols. For example, standards for Internet and other packet-switched network transmissions (e.g., TCP/IP, UDP/IP, HTML, and HTTP) may be used.

Unless otherwise defined, all technical and scientific terms used herein have the same meaning as commonly understood by one of ordinary skilled in the art to which this disclosure belongs. The system, methods, and examples provided herein are illustrative only and not intended to be limiting.

While language has been used to describe the disclosure, any limitations arising on account of the same are not intended. As would be apparent to a person in the art, various working modifications may be made to the method to implement the inventive concept as taught herein.

The drawings and the forgoing description give examples of embodiments. Those skilled in the art will appreciate that one or more of the described elements may well be combined into a single functional element. In embodiments, elements may be split into multiple functional elements. Elements from one embodiment may be added to another embodiment. For example, orders of processes described herein may be changed and are not limited to the manner described herein.

Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these examples. Numerous variations, whether explicitly given in the specification or not, such as differences in structure, dimension, and use of material, are possible. The scope of embodiments is at least as broad as given by the following claims.

Benefits, other advantages, and solutions to problems have been described above with regard to specific embodiments. However, the benefits, advantages, solutions to the problem and any component(s) that may cause any benefit, advantage, or solution to occur or become more pronounced are not to be construed as a critical, required, or essential feature or component of any or all the claims.

What is claimed is:

1. A method of optimized wireless power sharing comprising:

initiating, between a first electronic device and a second electronic device, a wireless power sharing session as a power supplier and a power consumer;

mutually authenticating the first electronic device with the second electronic device wirelessly;

determining, by at least one of the first electronic device or the second electronic device, a physical disposition of the first electronic device and the second electronic device as a part of the wireless power sharing session;

computing, by at least one of the first electronic device or the second electronic device, a power profile and transferring wirelessly the power profile from at least one of the first electronic device to the second electronic device or from the second electronic device to the first electronic device;

identifying, by at least one of the first electronic device or the second electronic device, a plurality of computational resources eligible for a handover based on artificial intelligence techniques and the power profile; and transferring an information wirelessly between the first electronic device and the second electronic device for triggering a handover of the plurality of computational resources, wherein the transferring is defined as at least one of:

transferring of the information of the plurality of computational resources from the first electronic device to the second electronic device; or transferring of the information of the plurality of computational resources from the second electronic device to the first electronic device.

2. The method as claimed in claim 1, further comprising:

executing, by first electronic device and the second electronic device, incoming events targeted for at least one of the first electronic device or the second electronic device depending on resources handed over through transferring of the information, wherein the incoming events are executed individually by the first electronic device and the second electronic device or in synchronization with each other based on the transferred information.

3. The method as claimed in claim 1, wherein the triggering of the handover further comprises:

initiating, by the first electronic device and the second electronic device, a resource sharing session between the first electronic device and the second electronic device; and transferring the information as handover information comprising a list of the plurality of computational resources wirelessly between the first electronic device and the second electronic device through the resource sharing session.

4. The method as claimed in claim 1, wherein the wireless power sharing session further comprises:

the first electronic device acting as the power supplier; and the second electronic device acting as the power consumer;

wherein at least one of the first electronic device or the second electronic device correspond to a plurality of devices acting as the power supplier or the power consumer.

5. The method as claimed in claim 1, wherein the mutually authenticating further comprises: performing, by the first electronic device and the second electronic device, a mutual authentication wirelessly involving sharing and validating identifiers of both the first electronic device and the second electronic device between the first electronic device and the second electronic device.

6. The method as claimed in claim 1, wherein the determining the physical disposition further comprises:

determining, by at least one of the first electronic device or the second electronic device, a respective physical configuration within a stacked arrangement of a top device and a bottom device.

7. The method as claimed in claim 1, wherein the power profile further comprises at least one of:

an average historical power usage and usage frequency of individual resources on hourly basis;

an instantaneous drain rate; or current overall power levels, wherein the power profile is transferred unidirectionally or bidirectionally between the first electronic device and the second electronic device over a secure low power short range communication channel.

8. A method of synchronized execution of events by at least one device during wireless power sharing comprising:

detecting, by a first electronic device, an incoming event and based thereupon determining an information associated with the incoming event;

determining, by the first electronic device, a number of computational resources required for executing the incoming event based on determining the information associated with the incoming event;

determining, by the first electronic device, partial resources out of the number of computational resources handed over to a second electronic device during a prior resource handover session;

computing, by the first electronic device, a first partial event information out of the determined information of event, said first partial event information required for executing the determined partial resources handed over to the second electronic device;

transferring, by the first electronic device, the first partial event information to the second electronic device;

creating, by at least one of the first electronic device or the second electronic device, a proxy event instance for at least one of the first electronic device or the second electronic device, the proxy instance representing a partial version of the incoming event and associated with at least one of:

the first electronic device and a second partial event information out of the determined information of event; or the second electronic device and the first partial event information; and executing the incoming event by one or more of:

an individual execution of a partial event by either the first electronic device or the second electronic device;

a synchronized execution of the proxy event instance at both the first electronic device and the second electronic device to result in a combined event execution.

9. The method as claimed in claim 8, wherein the incoming event further comprises an interrupt or trigger on an operating system or on any installed application within the first electronic device.

10. The method as claimed in claim 8, wherein the first partial event information is transferred on a secured low power short range communication channel.

11. The method as claimed in claim 8, further comprising determining, by the first electronic device, whether the incoming event is targeted for the first electronic device or for the second electronic device based on the prior resource handover session.

12. The method as claimed in claim 8, wherein the first electronic device corresponds to a lower device in a stacked arrangement as a power consumer device, the method further comprises:

creating by the second electronic device the proxy event instance as a power supplier, the proxy instance representing the partial version of the incoming event and associated with the first partial event information; and executing the incoming event by the individual execution of the partial event at the second electronic device.

13. A system of optimized wireless power sharing between at least two devices configured to perform:

a first electronic device and a second electronic device for initiating a wireless power sharing session as a power supplier and a power consumer;

a trusted device manager for mutually authenticating the first electronic device with the second electronic device wirelessly;

a configuration checker for determining a physical disposition of the first electronic device and the second electronic device as a part of the wireless power sharing session;

a power profile computer for computing a power profile of at least one of the first electronic device or the second electronic device and transferring wirelessly the power profile from at least one of the first electronic device to the second electronic device or from the second electronic device to the first electronic device;

a handover resource manager configured to:

identifying, by at least one of the first electronic device or the second electronic device, a plurality of computational resources eligible for a handover based on artificial intelligence techniques and the power profile; and transferring an information wirelessly between the first electronic device and the second electronic device for triggering a handover of the plurality of computational resources, wherein said transferring is defined as at least one of:

transferring of the information of the plurality of computational resources from the first electronic device to the second electronic device; or transferring of the information of the plurality of computational resources from the second electronic device to the first electronic device.

14. The system as claimed in claim 13, further comprising:

executing, by the first electronic device and the second electronic device, incoming events targeted for the first electronic device or the second electronic device depending on resources handed over through the transfer of the information, wherein the incoming events are executed individually by the first electronic device and the second electronic device or in synchronization with each other based on the transferred information.

15. A system of synchronized execution of events by at least one device during wireless power sharing configured to perform:

an interceptor configured for:

detecting, by a first electronic device, an incoming event and based thereupon determining an information associated with the incoming event;

determining, by the first electronic device, a number of computational resources required for executing the incoming event based on determining the information associated with the incoming event;

determining, by the first electronic device, partial resources out of the number of computational resources handed over to a second electronic device during a prior resource handover session;

computing, by the first electronic device, a first partial event information out of the determined information of event, said first partial event information required for executing the determined partial resources handed over to the second electronic device;

a sender for:

transferring, by the first electronic device, the first partial event information to the second electronic device;

a receiver for creating, by at least one of the first electronic device or the second electronic device, a proxy event instance for at least one of the first electronic device or the second electronic device, the proxy instance representing a partial version of the incoming event and associated with at least one of:

the first electronic device and a second partial event information out of the determined information of event;

the second electronic device and the first partial event information; or a simulator for executing the incoming event by at least one of:

an individual execution of a partial event by either the first electronic device or the second electronic device; or a synchronized execution of the proxy event instance at the first electronic device and the second electronic device to result in a combined event execution.

* * * * *